April 7, 1942.   J. P. SPANG   2,279,071
MEAT-SLITTING MACHINE
Filed Feb. 6, 1940   2 Sheets-Sheet 2
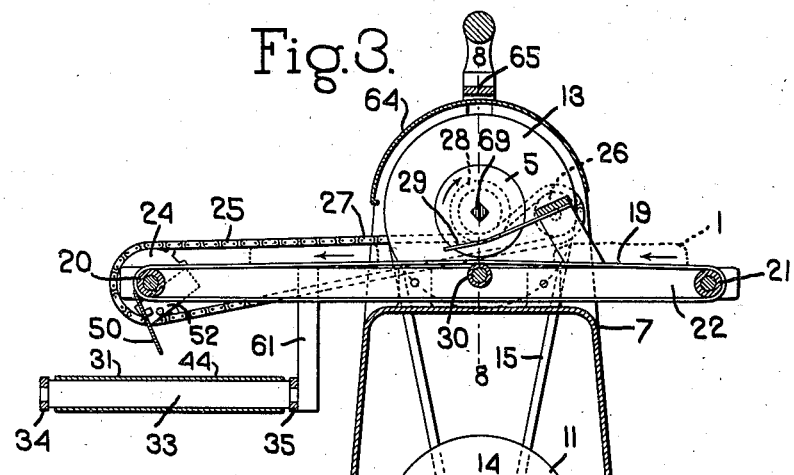
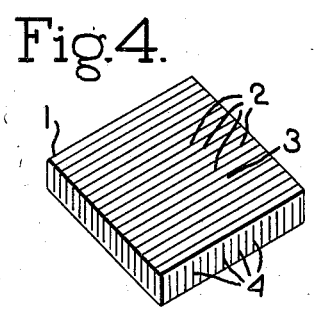
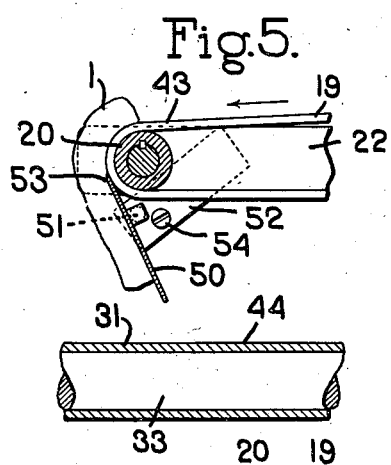
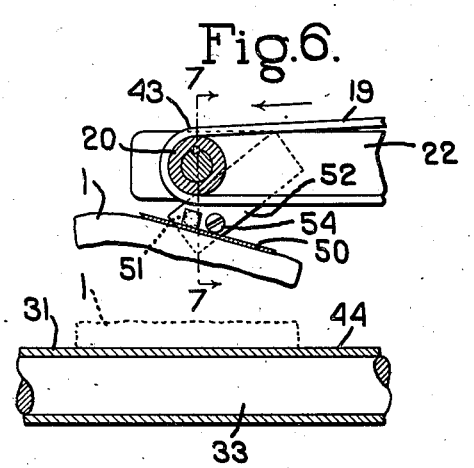
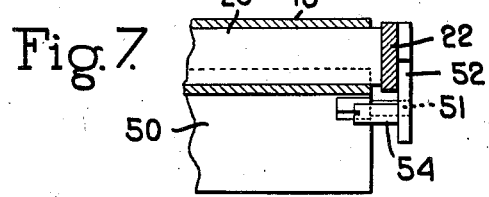
Inventor.
Joseph P. Spang
by Heard Smith & Tennant.
Attys.

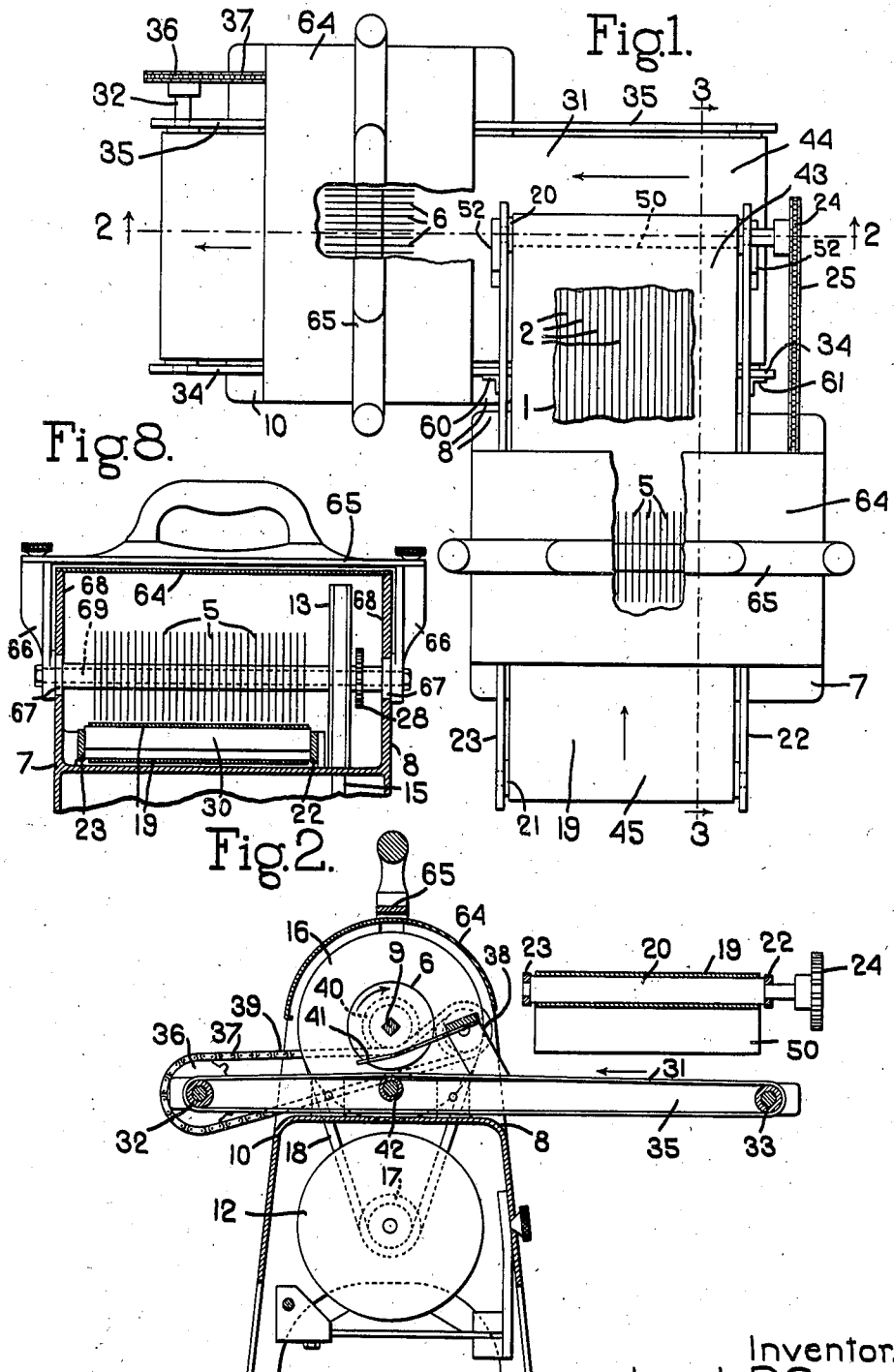

Patented Apr. 7, 1942

2,279,071

UNITED STATES PATENT OFFICE 2,279,071

MEAT-SLITTING MACHINE

Joseph P. Spang, Quincy, Mass., assignor to Cube Steak Machine Company, Inc., Boston, Mass., a corporation of Massachusetts Application February 6, 1940, Serial No. 317,479

8 Claims. (Cl. 17—25)

This invention relates to machines for slitting meat and has for its general object to provide a machine for this purpose which is constructed so as to cut slits on both sides of a slice of meat with the slits on one side extending at an angle to those on the other side.

A further object of the invention is to provide a meat-slitting machine of this type which is provided with two sets of rotary slitting knives, together with means for feeding the slice of meat to be slit to the sets of knives successively, and means for inverting the slice of meat in its passage from the first set of knives to the second set so that when the slice of meat reaches the second set of knives, it will have its unslit face uppermost and in position to be acted on by the second set of knives.

A further object of the invention is to provide a machine of this type in which the direction of feeding movement of the slice is changed after it has been delivered from the first set of knives and before it is fed to the second set of knives, so that the slits which are made by the second set of knives will have an angular relation to those which were made by the first set of knives.

Other objects of the invention are to improve meat-slitting machines in various particulars, as will be more fully hereinafter set forth.

In the drawings:

Fig. 1 is a top plan view of a machine embodying my invention.

Fig. 2 is a section on the line 2—2, Fig. 1.

Fig. 3 is a section on the line 3—3, Fig. 1.

Fig. 4 is a perspective view of a slice of meat which has been slit on the machine herein shown.

Figs. 5 and 6 are fragmentary detail views illustrating the manner in which the slice of meat is inverted.

Fig. 7 is a fragmentary section on the line 7—7, Fig. 6.

Fig. 8 is a section on the line 8—8, Fig. 3.

As stated above, my improved meat-slitting machine comprises two sets of rotary slitting knives, each adapted to cut a series of parallel slits in a slice of meat, means to feed the slice of meat to the sets of knives successively, and means for inverting the slice during its passage from the first set of knives to the second set of knives, so that the second set of knives will cut slits in the opposite face of the slice from that in which the slits were cut in the first set of knives.

A slice of meat having slits cut in it in the manner above described is illustrated in Fig. 4, said slice, which is indicated at 1, having a series of parallel slits 2 cut in the face 3 thereof, the slits extending nearly but not quite through the slice and also having a series of parallel slits 4 cut in the underface thereof, said slits 4 extending at right angles to the slits 3 and extending nearly but not quite through the slice.

A slice of meat slit in this way is illustrated in the U. S. Patent to Gurney, No. 2,046,118, June 30, 1936.

My improved machine for slitting the meat in the manner shown in Fig. 4 comprises a set of rotary slitting knives 5 adapted to cut the slits in one face of the meat, and a second set of rotary slitting knives 6 adapted to cut slits in the opposite face of the slice, together with means for feeding the slice to the sets of knives and inverting the slice during its passage from the first set of knives to the second set of knives.

The rotary knives 5 are carried by a knife shaft 69 which is rotatably mounted in the portion 7 of the machine frame 8 while the rotary knives 6 are supported on a knife shaft 9 which is rotatably mounted in the portion 10 of the machine frame 8.

The two sets of knives may be driven by any suitable means, and as herein illustrated, I have provided a motor 11 for rotating the knives 5 and a separate motor 12 for rotating the knives 6.

The knife shaft 69 is provided with a driving pulley 13 which is belted to a pulley 14 fast on the shaft of the motor 11 by means of a driving belt 15.

The knife shaft 9 is shown as having a driving pulley 16 thereon which is driven from a pulley 17 fast on the shaft of the motor 12 by means of a driving belt 18.

The means for feeding the meat to the knives 5 comprises an endless feed apron 19 which is supported by two rolls 20, 21 that are carried at the ends of two bars 22, 23, which are carried by the frame portion 7.

The feed apron 19 is shown as being operated from the knife shaft 69, and for this purpose the roll 20, which constitutes the drive roll for the feed apron, has fast therewith a sprocket wheel 24 around which passes a sprocket chain 25 which also passes around an idler sprocket wheel 26 that is carried by the frame. The upper run 27 of the sprocket chain 25 passes under and in operative engagement with a sprocket wheel 28 that is fast on the knife shaft 69.

The power for driving the feed apron 19 is thus derived from the knife shaft 69 and the relative size of the sprocket wheels and the knives are such that the forward feeding movement of the feed apron 19 is somewhat less than the peripheral speed of the knives 5, so that the latter will act on a slice of meat with a draw cut.

29 indicates stripper fingers which extend between the knives 5 and serve to hold the meat onto the apron 19 during the time that the knives are acting thereon, thus preventing the slice from being lifted off from the apron by the rapidly rotating knives.

The portion of the apron directly beneath the knives is supported by a roll 30 thus preventing the apron from sagging at the point thereof which supports the meat while it is being acted on by the knives.

The means for feeding the meat to the second set of knives 6 also includes a feed apron 31 which is supported by two rolls 32, 33 that are carried by a frame comprising the two side rails 34, 35, said side rails being suitably supported on the portion 10 of the frame. The driving means for the feed apron 31 is similar to that for the apron 19. The roll 32, which constitutes a drive roll, has a sprocket wheel 36 fast thereon around which passes a sprocket chain 37 which also passes around an idler sprocket wheel 38. The upper run 39 of the sprocket chain 37 passes under and in operative engagement with a sprocket wheel 40 fast on the knife shaft 9. The size relation between the sprocket wheels 36, 40, and the knives 6 is such that the apron 31 will move forward at a slower speed than the peripheral speed of the knives 6, so that the latter operate on the meat with a draw cut. 41 indicates stripper fingers similar to stripper fingers 29 and which serve to hold the meat against the apron 31 while the knives 6 are acting thereon.

42 indicates a supporting roll beneath the upper run of the apron 31 and which provides a support for the portion thereof that carries the slice 1 of meat while the knives 6 are cutting the slits therein.

The knives 5 and 6 as well as the feed aprons 19 and 31 are arranged at right angles to each other and said feed aprons have such relation that the delivery end 43 of the feed apron 19 stands above the receiving end 44 of the apron 31, and my present invention includes means for inverting the slice 1 of meat during its passage from the delivery end 43 of the apron 19 to the receiving end 44 of the apron 31.

The slice of meat 1 to be slit is placed on the receiving end 45 of the apron 19 and the latter will feed the slice of meat to the knives 5, which will cut a series of parallel slits 2 in the upper face of the slice, as indicated in Fig. 1. As the slice of meat is delivered from the apron 19, it is inverted so that the slit face thereof will rest on the receiving end 44 of the apron 31 and the upper face of the meat will be the unslit face. The apron 31 which is moving in a right angular direction with reference to the apron 19 will then feed the meat to the knives 6, which will cut slits 4 in the then upper face of the slice, which slits 4 will extend at right angles to the slits 2.

The supporting rolls 30 and 42 are preferably adjusted so that each set of knives will cut slits nearly but not quite through the slice, and thus when the slice is delivered from the feed apron 31, it will be slit in the manner illustrated in Fig. 4, and in said Gurney patent, No. 2,046,118. The means for inverting the slice as it passes from the delivery end of the feed apron 19 onto the receiving end of the apron 31 is illustrated in Figs. 5, 6, and 7, and comprises a slice-inverting plate 50 which is pivotally mounted at 51 to brackets 52 depending from the side rails 22, 23. This slice-inverting plate 50 is located at the delivery end 43 of the apron 19 and it normally has a position shown in Fig. 5 with its upper end 53 resting against the apron 19 as it passes around the feed roll 20. As the slice 1 of meat reaches the delivery end of the feed apron 19, it will, because of its adhesion to the apron, follow the apron around the feed roll 20, and as it does so, the slice-inverting plate 50 will strip the slice from the apron.

The slice 1 of meat not only has sufficient adhesion to the apron 19 to cause it to follow around the apron as the latter passes around the roll 20 but as the slice passes off from the apron onto the slice-inverting plate 50 there will also exist such adhesion between the slice and the plate to cause the slice to slide down the inclined plate, as shown in Fig. 5. As the meat moves down over the face of the plate 50, the total adhesion between the meat and the plate will increase as the area of the contacting surfaces between the slice and the plate increases, with the result that the slice will be held to the plate notwithstanding the inclined position of the latter.

When the slice has been fed into substantially the position shown in Fig. 5, the adhesion between the meat and the plate 50 together with the forward feeding movement of the slice given to it by the travelling apron 19 causes the slice-inverting plate 50 to swing into the position shown in Fig. 6, thus inverting the slice of meat and bringing it into a position to drop from the plate 50 onto the apron 31 in an inverted position.

To insure the separation of the slice 1 from the plate 50 after the slice has been inverted, I have provided a stop which limits the swinging movement of the plate and which serves to give the plate a quick jarring effect when the latter has reached the limit of its swinging movement, thereby to jar the slice loose from the plate in case the adhesion between the slice and the plate should be sufficient to overcome the action of gravity.

The supporting bracket 52 is shown as having a stop pin 54 projecting therefrom and situated in position to be struck by the plate 50 as it swings from the position shown in Fig. 5 to that shown in Fig. 6.

When the slice of meat reaches the position shown in Fig. 5, the continued action of the apron 19 thereon will tend to swing the plate with the meat adhering thereto into the position shown in Fig. 6, and, as the contacting surface between the meat and the apron decreases, a point will finally be reached at which the plate with the meat thereon will have a quick swinging movement which brings the plate against the stop 54 with a sufficient impact to insure that the slice of meat is jarred loose from the plate.

When the inverted slice of meat has been deposited on the apron 31, the latter will feed it forward and deliver it to the knives 6 which will cut the slits on the opposite face of the slice from that in which the slits were cut by the first set of knives 5.

In order to maintain the aprons in their proper operative relation, I have shown the side rails 23 and 34 connected by a vertically extending tie member 60 and have also shown the side rails 22 and 34 similarly connected by a vertically extending tie bar 61.

If desired, the supporting rolls 30 and 42 may be made adjustable to vary the depths of the slits in the manner illustrated in my co-pending application, Serial No. 272,602, filed May 9, 1939, of which this application is a continuation in part.

64 indicate cover plates which cover and protect the knives 5 and 6, and 65 represent bail-shaped members by which the knives can be adjusted toward and from the aprons in a manner similar to that set forth in my above-mentioned co-pending application, Serial No. 272,602. Each of the two arms 66 of the members 65 is provided at its lower end with a hub portion 67 which is journaled in the side pieces 68 of the frame. These hub portions 67 form the bearings for the knife shaft, the latter being eccentrically mounted in the hubs so that swinging movement of the member will raise and lower the knives as illustrated in my above-mentioned application, Serial No. 272,602.

I claim:

1. A meat-slitting machine comprising two sets of slitting knives, means to feed a slice of meat to said sets of knives successively, the knives of each set being constructed to cut slits in said slices which extend in the direction of the feeding movement of the slices, and means to completely invert the slice during its travel from the first set of knives to the second set of knives, whereby the slits cut by the second set of knives are in the opposite face of the slice from the slits cut by the first set of knives.

2. A meat-slitting machine comprising two sets of rotary slitting knives arranged with the axis of the knives of one set at an angle to that of the other set, means to feed a slice of meat to said sets of knives successively, and means to invert the slice during its travel from the first set of knives to the second set of knives.

3. A meat-slitting machine comprising a set of rotary slitting knives, an endless apron to feed a slice of meat to said knives, a second set of rotary slitting knives rotatable about an axis at an angle to that of the first set, meat-feeding means for feeding a slice to the knives of the second set, and means to deliver the slice of meat from said apron to the meat-feeding means in an inverted position.

4. A meat-slitting machine comprising a set of rotary slitting knives, an endless apron to feed a slice of meat to said knives, a second set of rotary slitting knives rotating about an axis at an angle to that of the first set, meat-feeding means for feeding a slice of meat to the knives of the second set, said endless apron delivering said slice after it has been acted on by the first set of knives to the meat-feeding means, and means at the delivery end of the apron to invert the slice as it is thus delivered.

5. A meat-slitting machine comprising two sets of rotary slitting knives, means to rotate the knives, means to feed a slice to be slit beneath one set of knives, whereby said knives will cut slits in the top surface of said slice, meat-feeding means for feeding said slice beneath the other set of knives, and means to invert the slice after it has been slit by the knives of the first set and to deliver said slice in inverted position onto the meat-feeding means for the second set of knives.

6. A meat-slitting machine comprising two sets of rotary slitting knives, means to rotate the knives, an endless feed apron situated beneath the knives of one set, means to operate said apron, thereby to feed a slice of meat past the knives which operate to cut slits in the upper face of the slice, meat-feeding means for feeding said slice beneath the other set of knives, and means to deliver the slice from the endless feed apron onto the feeding means in inverted position.

7. A meat-slitting machine comprising two sets of rotary slitting knives, means to rotate the knives, an endless apron for feeding a slice to be slit beneath one set of knives, whereby said knives will cut slits in the upper surface of said slice, meat-feeding means for feeding said slice to the other set of knives, a pivoted slice-inverting plate at the delivery end of the feed apron operating to receive the slice from the apron and deliver it to the meat-feeding means in inverted position.

8. A meat-slitting machine comprising two sets of rotary slitting knives, means to rotate said knives, means to feed a slice of meat beneath first one and then the other set of knives, and means to completely invert the slice during its travel from the first set of knives to the second set of knives.

JOSEPH P. SPANG.